(12) United States Patent
Leebow

(10) Patent No.: US 8,892,987 B2
(45) Date of Patent: Nov. 18, 2014

(54) SYSTEM AND METHOD FOR FACILITATING ONLINE SOCIAL NETWORKING

(75) Inventor: Eric Leebow, New York, NY (US)

(73) Assignee: FreezeCrowd, Inc., New York, NY (US)

( * ) Notice: Subject to any disclaimer, the term of this patent is extended or adjusted under 35 U.S.C. 154(b) by 1066 days.

(21) Appl. No.: 12/480,813

(22) Filed: Jun. 9, 2009

(65) Prior Publication Data

US 2010/0050090 A1 Feb. 25, 2010

Related U.S. Application Data

(63) Continuation of application No. 11/531,964, filed on Sep. 14, 2006, now abandoned.

(51) Int. Cl.
*G06F 17/00* (2006.01)
*G06F 3/048* (2013.01)
*G06Q 10/10* (2012.01)

(52) U.S. Cl.
CPC ............... *G06Q 10/10* (2013.01); *G06F 3/048* (2013.01)
USPC ........................... 715/204; 715/202; 715/751

(58) Field of Classification Search
CPC ............................... G06Q 10/10; G06F 3/048
USPC .............. 345/173; 707/10; 715/202, 204, 751
See application file for complete search history.

(56) References Cited

U.S. PATENT DOCUMENTS

| | | |
|---|---|---|
| 5,544,305 A | 8/1996 | Ohmaye et al. |
| 5,859,623 A | 1/1999 | Meyn et al. |
| 6,035,074 A | 3/2000 | Fujimoto et al. |
| 6,421,070 B1 | 7/2002 | Ramos et al. |
| 6,629,100 B2 | 9/2003 | Morris et al. |
| 6,629,104 B1 | 9/2003 | Parulski et al. |
| 6,724,919 B1 | 4/2004 | Akiyama et al. |
| 6,847,379 B2 | 1/2005 | Grosvenor et al. |
| 6,961,446 B2 | 11/2005 | Imagawa et al. |
| 7,010,751 B2 | 3/2006 | Shneiderman |
| 7,403,642 B2 | 7/2008 | Zhang et al. |
| 7,415,662 B2 * | 8/2008 | Rothmuller et al. .......... 715/200 |
| 2002/0048397 A1 | 4/2002 | Lloyd-Jones |
| 2002/0111939 A1 | 8/2002 | Kondo et al. |
| 2004/0264780 A1 | 12/2004 | Zhang et al. |
| 2005/0021750 A1 * | 1/2005 | Abrams ........................ 709/225 |
| 2005/0027705 A1 | 2/2005 | Sadri et al. |
| 2005/0055451 A1 * | 3/2005 | Tsuyama et al. .............. 709/229 |
| 2005/0097080 A1 | 5/2005 | KethiReddy et al. |
| 2005/0197922 A1 | 9/2005 | Pezaris et al. |

(Continued)

OTHER PUBLICATIONS

U.S. Office Action Dated Jan. 9, 2009;—U.S. Appl. No. 11/531,964, filed Sep. 14, 2006.

(Continued)

*Primary Examiner* — William Bashore
*Assistant Examiner* — Gregory A Distefano
(74) *Attorney, Agent, or Firm* — Thompson Hine LLP

(57) ABSTRACT

A method for operating a website for an online social networking includes is provided. The website receives a group picture depicting a plurality of individuals. Faces of the plurality of individuals depicted in the group picture are identified and personal information related to each identified face is requested and received. Each identified face in the group picture is cropped to create a plurality of cropped images, and the plurality of cropped images are displayed.

7 Claims, 14 Drawing Sheets

(56) References Cited

U.S. PATENT DOCUMENTS

| | | |
|---|---|---|
| 2005/0283497 A1 | 12/2005 | Nurminen et al. |
| 2006/0018522 A1* | 1/2006 | Sunzeri et al. ............... 382/118 |
| 2006/0033754 A1 | 2/2006 | Evans |
| 2006/0050993 A1 | 3/2006 | Stentiford |
| 2006/0098105 A1 | 5/2006 | Okisu et al. |
| 2006/0184578 A1 | 8/2006 | La Rotonda et al. |
| 2006/0204057 A1* | 9/2006 | Steinberg ..................... 382/118 |
| 2006/0251339 A1 | 11/2006 | Gokturk et al. |
| 2006/0253491 A1* | 11/2006 | Gokturk et al. ............ 707/104.1 |
| 2006/0274960 A1 | 12/2006 | Tamaru |
| 2007/0156910 A1 | 7/2007 | Christie et al. |
| 2007/0183634 A1* | 8/2007 | Dussich et al. ............... 382/118 |
| 2007/0255695 A1 | 11/2007 | Hu et al. |
| 2007/0266312 A1 | 11/2007 | Ayaki et al. |
| 2007/0282987 A1 | 12/2007 | Fischer et al. |
| 2007/0288378 A1 | 12/2007 | Ferrara et al. |
| 2008/0005125 A1 | 1/2008 | Gaedeke |
| 2008/0046458 A1 | 2/2008 | Tseng et al. |
| 2008/0062283 A1 | 3/2008 | Matsushita et al. |
| 2008/0069480 A1 | 3/2008 | Aarabi et al. |
| 2008/0077595 A1 | 3/2008 | Leebow |
| 2008/0086458 A1 | 4/2008 | Robinson et al. |
| 2008/0091723 A1 | 4/2008 | Zuckerberg et al. |
| 2008/0109244 A1 | 5/2008 | Gupta |
| 2008/0162450 A1 | 7/2008 | McIntyre et al. |
| 2008/0220750 A1 | 9/2008 | Steinberg et al. |
| 2008/0270425 A1 | 10/2008 | Cotgreave |
| 2008/0275850 A1 | 11/2008 | Asai |
| 2008/0288588 A1 | 11/2008 | Andam et al. |
| 2008/0319943 A1 | 12/2008 | Fischer |
| 2009/0060289 A1 | 3/2009 | Shah et al. |
| 2011/0080427 A1* | 4/2011 | Oda et al. ..................... 345/634 |

OTHER PUBLICATIONS

Facebook.com customer service FAQ taken from www.facebook.com/help.php, published Nov. 2005, pp. 1-4.

"Face annotation for family photo album management", by Chen et al., published 2003, International Journal of Image and Graphics, pp. 1-14.

"Facebook: Threats to Privacy", by Jones et al., published Dec. 14, 2005, pp. 1-76.

"How do I invite my friends to join MySpace", by Dave Taylor, taken from www.askdavetaylor.com/how_do_i_add_my_myspace_account.html, published May 24, 2006, pp. 1-9.

* cited by examiner

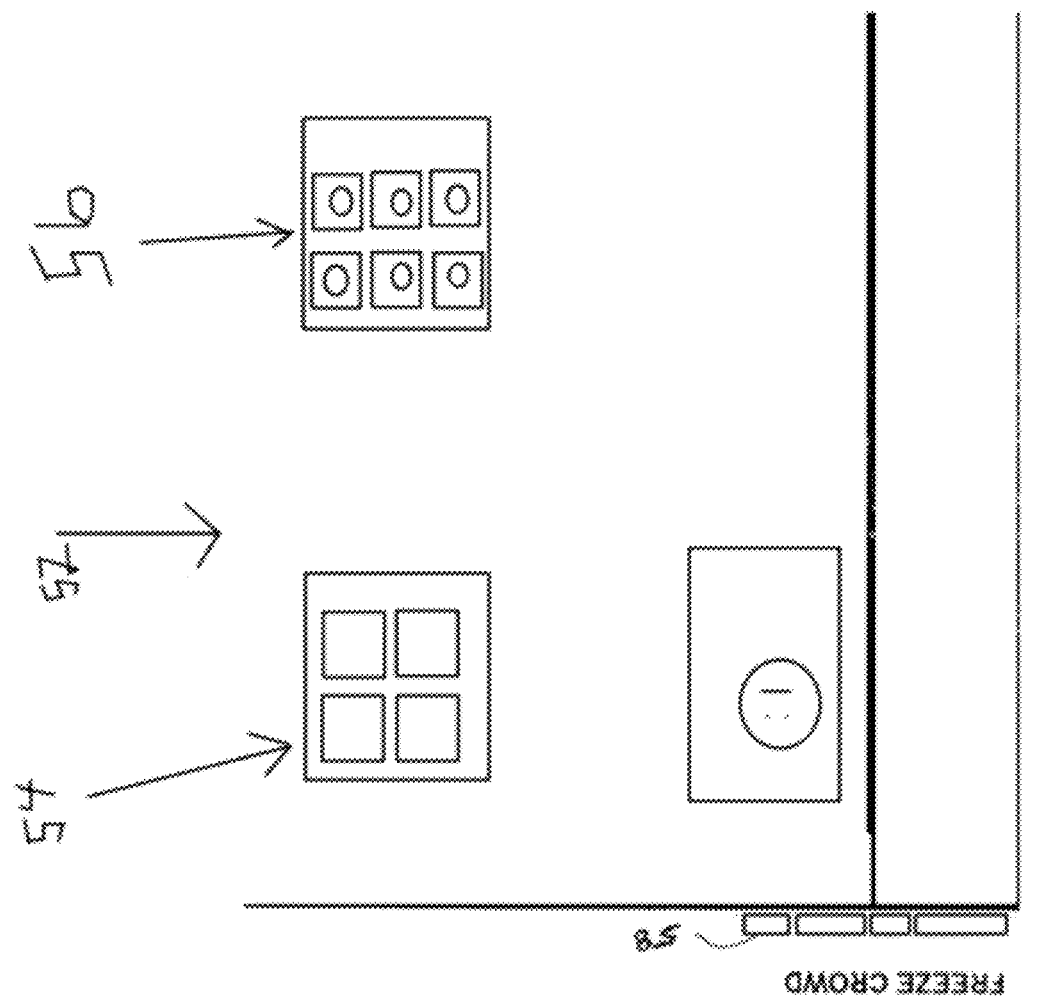

FreezeCrowd Picture Invitation
Invite Your Friends to FreezeCrowd by Picture

FreezeTag and enter your friends

Customize Your Welcome Message

Subject: [First Name of User] has FreezeFriended you on FreezeCrowd

Hi [First Name],

[Name of user] has FreezeFriended you in a group picture on FreezeCrowd. Join [Name of user] and his FreezeFriends on FreezeCrowd, the cool new social networking site for the college audience where you can create your own profile, share photos, join groups, chat, and more.

If you'd like to FreezeFriend [Name of user], please register for a FreezeCrowd account by clicking the link below:

http://www.freezecrowd.com/invite

-[Name of user]

Stand out in your crowd. Break the ice with FreezeCrowd.

Invite the FreezeCrowd

1
Before pressing FreezeCrowd Button, the user sees the picture as is.

Fig. 7b

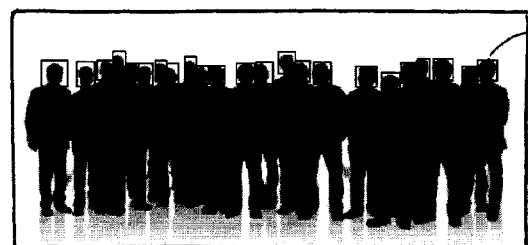

2
After pressing FreezeCrowd Button, the user sees the picture with boxes around users heads.

Fig. 7c

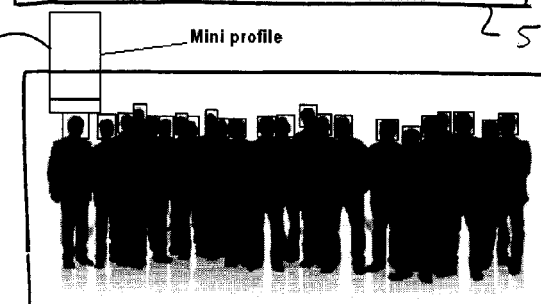

Mini profile

3
Freezing someone in the crowded picture allows the user to identify this user with a mini profile by simply clicking on their name.

Fig. 7d

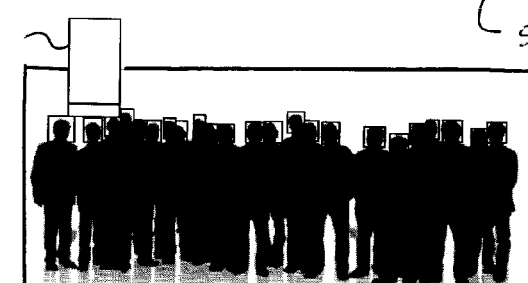

4
After clicking the right arrow next to the mini profile, the mini profile for the next identified user on the right in the picture is shown. If the user clicks the the left, the mini profile is shown for the next identified user on the left.

Fig. 7e

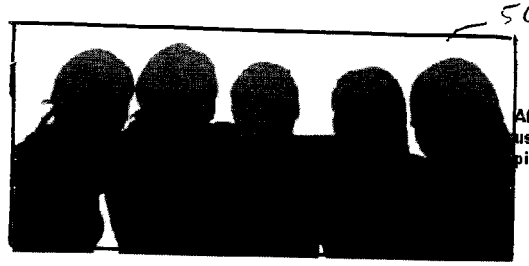

5
After clicking next or previous, the user can view the next or previous picture in the photo album.

SYSTEM AND METHOD FOR FACILITATING ONLINE SOCIAL NETWORKING

CROSS REFERENCE TO RELATED APPLICATIONS

This application is a Continuation-In-Part of U.S. Non-Provisional application Ser. No. 11/531,964, filed on Sep. 14, 2006.

FIELD OF INVENTION

The present invention generally relates to a computer-based data and information systems accessed via the Internet and, more particularly, to computer-based systems that facilitate social networking via the Internet.

BACKGROUND

A category of Internet applications known as online social networks are increasingly popular. These social networking websites help connect friends, business partners, or other individuals together using a variety of tools. The websites typically offer an interactive, user-submitted network of profiles, blogs, groups, photos, MP3s, videos, an internal e-mail system, etc. Examples of such websites are MySpace, Facebook, Bebo, Friendster, Xanga, My Yearbook, Classmates.com, and Live Journal.

Once users register as members at a social networking website, they typically create their own profile which contains standard interests and personal details such as marital status and physical appearance. Often images can be uploaded and an image can be chosen as the "default Image" that is seen on the profile's main page etc. Some websites provide the option of uploading videos. The profile often displays a number of the member's friends. On some websites, the member and/or the member's friends can leave comments for all viewers to read. The member may have the option to delete any comments. Additionally, or in the alternative, a member may be required to approve all comments before posting.

Members often can invite existing friends to join and search the user base of profiles for new friends. To invite existing friends, automated emails can be sent to the member's friends for their registration to the website. To find new friends, the user can search the site's profiles using search characteristics like age, gender, marital status, geographical location, etc.

SUMMARY OF THE INVENTION

A method for operating a website for an online social networking includes is provided. The website receives a group picture depicting a plurality of individuals. Faces of the plurality of individuals depicted in the group picture are identified and personal information related to each identified face is requested and received. Each identified face in the group picture is cropped to create a plurality of cropped images, and the plurality of cropped images are displayed.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

FIG. 4 is a user profile page of the system of FIG. 1;

FIG. 5 is a screen for using a group picture to invite friends to the website of the system of FIG. 1;

FIGS. 7a to 7b are screens showing group pictures during operation of an operator button of the system of FIG. 1;

FIG. 13b is a collection of cropped images of the individuals depicted in the exemplary group photo of FIG. 13a;

DETAILED DESCRIPTION

It will be apparent to those skilled in the art, that is, to those who have knowledge or experience in this area of technology, that many uses and design variations are possible for the improved online social networking system disclosed herein. The following detailed discussion of various embodiments will illustrate the general principles of the invention. Other embodiments suitable for other applications will be apparent to those skilled in the art given the benefit of this disclosure.

In the interest of clarity, not all of the routine features of the embodiments described herein are shown and described. It will of course, be appreciated that in the development of any such implementation, numerous specific decisions must be made in order to achieve the developer's specific goals, such as compliance with application and/or business related constraints, and that these specific goals will vary from one implementation to another and from one developer to another. Additionally, it will be appreciated that such development might be complex and time-consuming, but would nevertheless be a routine undertaking of engineering for those of ordinary skill in the art having the benefit of this disclosure.

The components, process steps and/or data structures may be implemented using various types of operating systems, computer platforms, computer programs, and/or general purpose machines. Those of ordinary skill in the art will recognize that devices of less general purpose or nature, such as hard wired devices, field programmable gate arrays FP-Gas), application specific integrated circuits (ASICs), or the like may also be used without departing from the spirit of the inventions disclosed herein.

Figure 1:
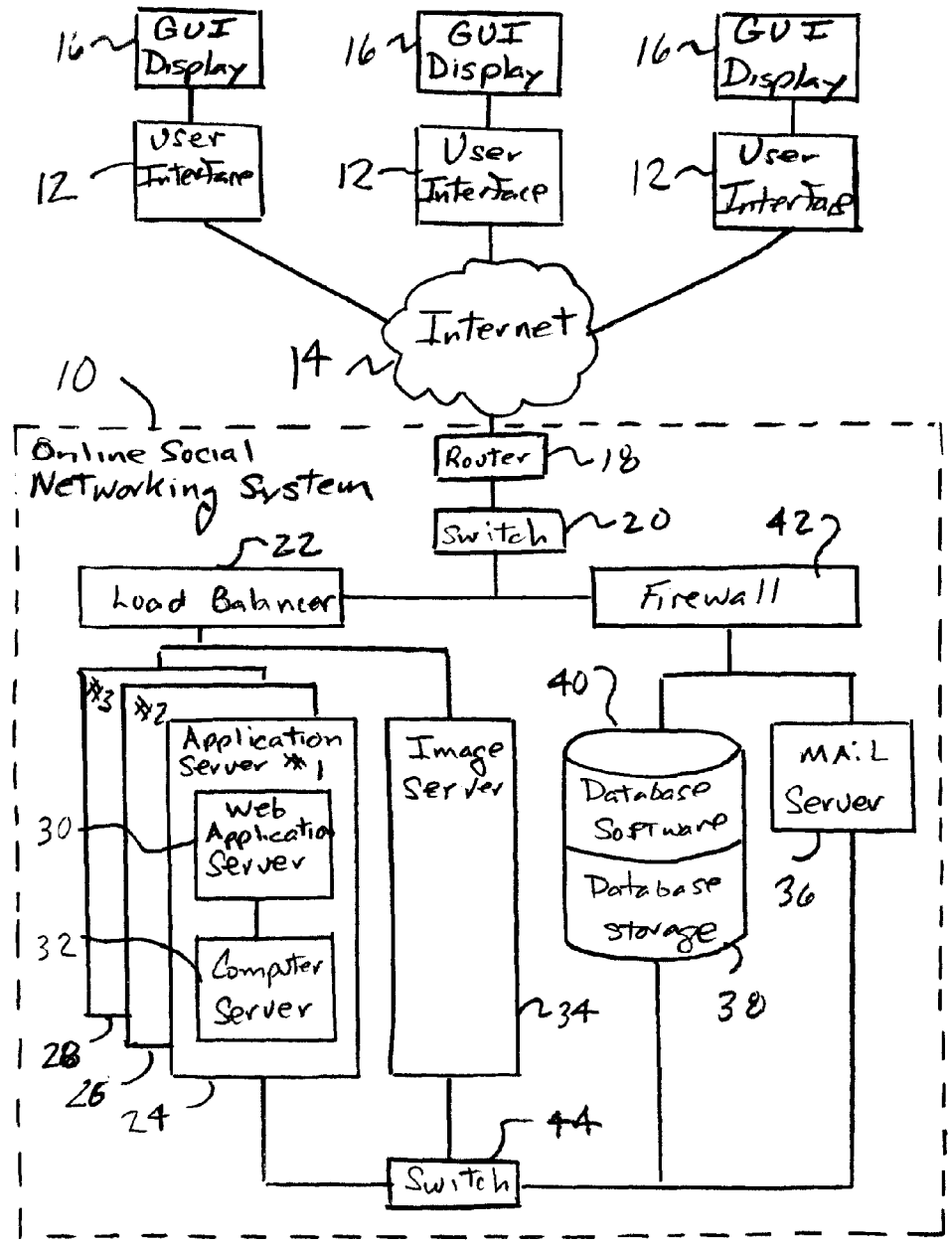
FIG. 1 is a diagrammatic view of one embodiment of an online social networking system.

FIG. 1 illustrates one embodiment of general architecture of an online social networking system 10. A plurality of user interface devices 12 are connected to the system 10 via the Internet 14. Each user interface device 12 may be any device capable of presenting data including, but not limited to, personal computers, cellular telephones, television sets, handheld digital personal assistants, and the like. The illustrated user interface devices 12 display graphical user interface (GUI) displays 16 to the users. As used herein, the term the "Internet" generally refers to the so called world wide network that connects networks to each other using the Internet Protocol (IP) and other similar protocols. While the illustrated embodiment utilizes the public network, the invention applies equally well to other public and private networks, including systems having architectures dissimilar to that illustrated in FIG. 1. For example, but not limited thereto, the system 10 can find application a closed university system or a private network of a company.

The illustrated system 10 is connected to the Internet 14 through a router 18 and a switch 20. As well known in the art, the router 18 forwards packets of information between networks. The router 18 forwards information packets between the system 10 and the user interface devices 12 via the Internet 14. The switch 20 acts as a gatekeeper to and from the Internet 14. A load balancer 22 balances traffic across a plurality of mirrored servers 24, 26, 28. While the illustrated embodiment shows three of the servers 24, 26, 28, any suitable number can be utilized. The illustrated servers 24, 26, 28, comprise a web application server 30 that sends out web pages in response to Hypertext Transfer Protocol (HTTP) requests from remotes browsers and a computer server 32 that serves as the application layer of the illustrated system 10. The web server 30 provides web pages to users of the system 10 which are displayed on the user interface devices 12 as the GUI displays. An image server 34 stores and provides digital images to other components of the system 10. A mail server 36 sends and receives electronic messages to and from the user interface devices 12. A database 38 and database software 40 are also provided. A firewall 42 provides protection from unauthorized access to the system 10. A second switch 44 allows components of the system 10 to be connected in a local area network (LAN), a wide area network (WAN), or the like. Thus, data can be transferred to and from the various components.

The computer server 32 may include a central processing unit (CPU), random access memory (RAM), and read only memory (ROM). The computer server 32 may be generally controlled and coordinated by operating system software. The operating system controls allocation of system resources and performs tasks such as processing, scheduling, memory management, networking, and I/O services among other things. The operating system is executed by the CPU and coordinates operation of the other components of the system 10.

The image server 34 manages digital photographs and other human viewable images. The image server 34 may be configured separately from the web server 30 or the web server 30 and the image server 34 can be configured together. Examples of image formats that can be managed by the image server 34 include, but are not limited to, Graphical Interchange Format (GIP), Joint Photographics Experts Group (JPEG), Portable Network Graphics (PNG) or Tagged Image File (TIP).

The mail server 36 is a repository for e-mail messages received from the Internet 14. The mail server 36 also manages the transmission of electronic messages ("electronic mail" or "e-mail"). The mail server 36 includes a storage area, a set of user definable rules, a list of users and a series of communications modules.

The databases 38, 40 store software, descriptive data, digital images, system data and any other data item required by the components of the system 10. The databases may be provided, for example, as a database management system (DBMS), an object-oriented database management system (ODBMS), a relational database management system (e.g. DB@, ACCESS, etc.), a file system, or any other conventional database package. The databases 38, 40 can be accessed via a structured query language (SQL) or other tools known to one of ordinary skill in the art.

The components appearing in the illustrated system 10 refer to an exemplary combination of components. As will be appreciated by those skilled in the art, various components can be eliminated, additional quantities of the illustrated components can be added, other components can be added, and the components can be configured in other ways within the scope of the present invention.

A user utilizes the user interface 12 to access the system 10 and register as a member of the online social networking system 10. The system provides a screen in which the user can provide descriptive data that enables the user to login securely and be identified by the system. Once a registered member, the user can construct their own profile. This can consist of uploading photographs and videos that can be viewed on the user's profile as described in more detail hereinafter.

Figure 2:
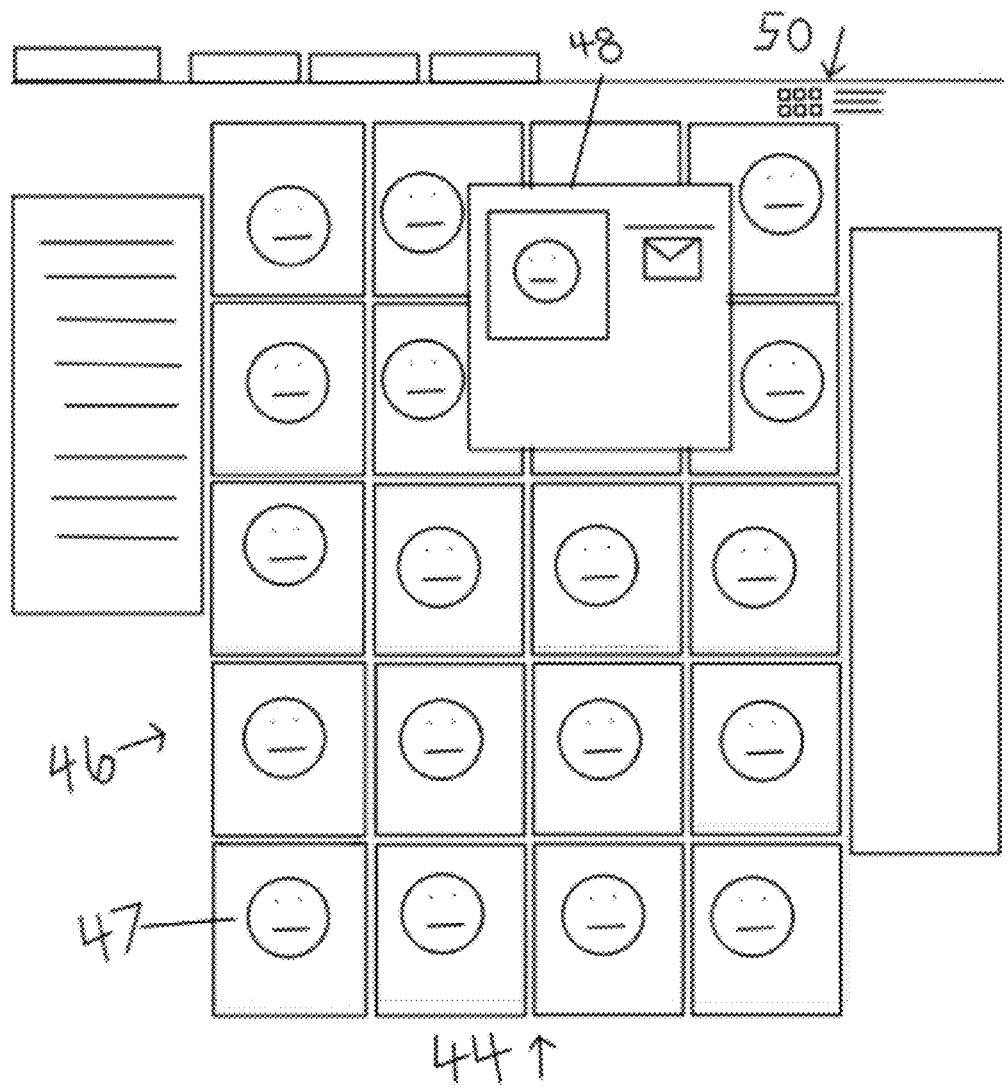
FIG. 2 is a search results screen of the system of FIG. 1.

A user can also search profiles of other users. FIG. 2 shows an exemplary search page or screen 44 showing search results 46. As shown, the user can search by name or can use an advanced search wherein other search criteria are utilized. The illustrated search page 44 shows the search results 46 in rows and columns wherein the search results are in the form of a photograph 47 and name of the user meeting the search criteria. When the user selects one of the search results 46, such as by moving a mouse cursor over the photograph, an information box 48 appears that contains information about the selected user. The illustrated information box 48 includes the user's name, photograph, network and/or school, major and/or year in school, geographical location. It should be understood that additional information may also be included in the information box 48, such as employer name, job title, membership in an organization, club, or sport, and position or title within the organization, club, or sport. Such information may be broadly referred to as the user's "role." Users may be tagged, connected, and searched according to their roles.

The illustrated information box 48 also includes links to view friends of the selected user, "Freeze Crowds" which are groups of friends of the selected user, award points of the selected user and rank within network, gifts of the selected user, and a photo album of the selected user. The illustrated information box 48 further includes links to send a message to the selected user, instant message the selected user, forward information about the selected user to a friend, add the selected user to the user's list of friends.

Figure 3:
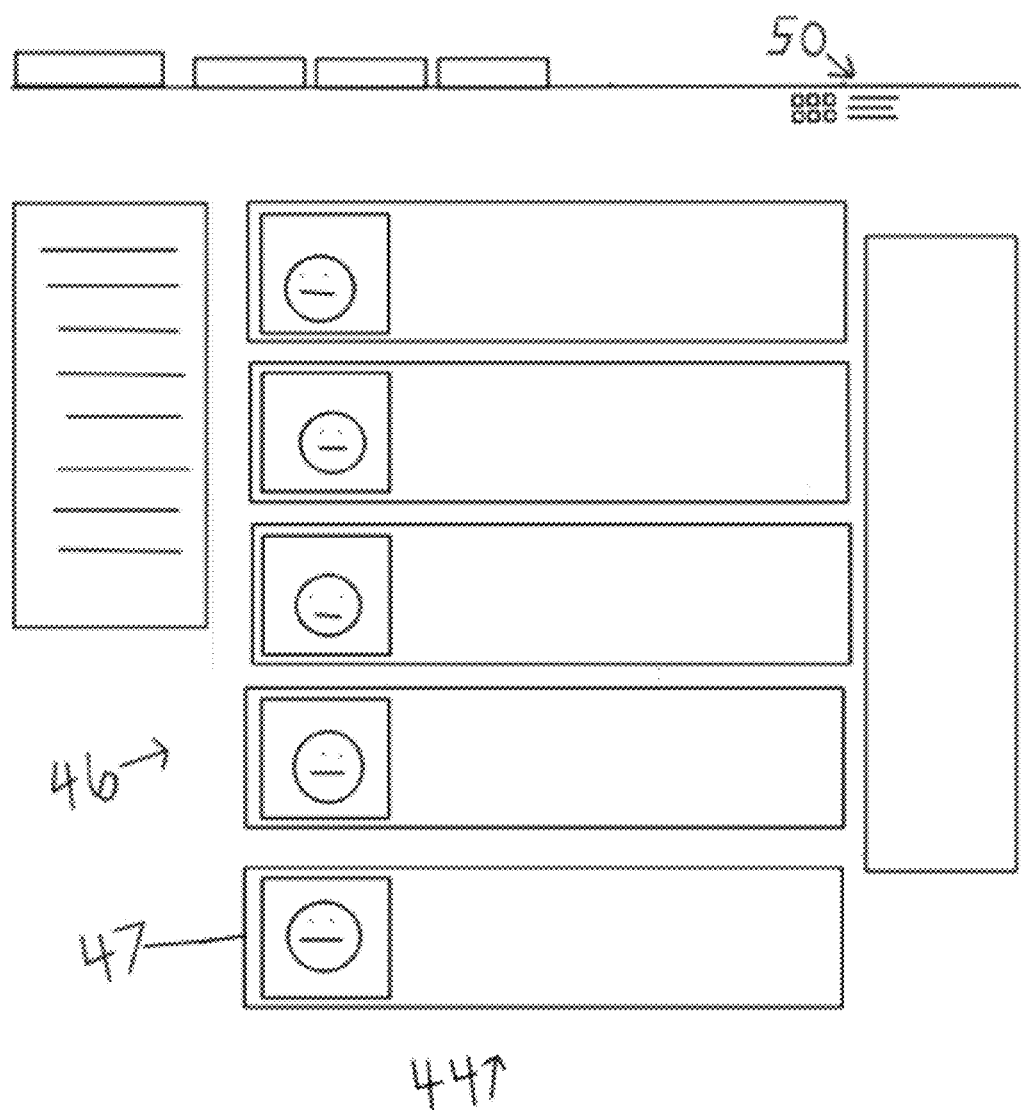
FIG. 3 is another search results screen of the system of FIG. 1.

By selecting an icon 50 at the top of the search page, the user can change the presentation format of the search results 46. FIG. 3 shows an exemplary search screen 44 showing the search results 46 in rows wherein the search results 46 generally include all of the information in the information boxes 48 described above. Thus, fewer users are viewed on a single page but all of the information is shown without opening individual text information boxes 48.

By selecting the photograph 47 on the search results 46, such as by clicking on the photograph 47 with a mouse, the user can display the profile page 52 for the selected user. FIG.

4 shows an exemplary profile screen or page 52 of a user. The illustrated profile page 52 includes an "about me" window which includes the selected user's name, photograph, school, year in school, major, birthday, e-mail address, website address, a personal message from the selected user, and a photo album. The illustrated profile page includes a "message" window which includes information from the selected user. The illustrated profile page also includes a "friends" window which includes photographs of all or some of the selected user's friends. The illustrated "friends" window also includes links to the profile pages of the friends. The illustrated profile page also includes a "Freeze Crowds" window 54 which includes photographs 56 of groups of friends of the selected user's friends. The illustrated "Freeze Crowds" window 54 also includes links to more information regarding the photographs 56. The illustrated profile page 52 also displays information about friends of the selected user that are in other networks such as the names of the networks and the number of friends in each of the networks. The illustrated profile page also includes links to "FreezeFriend" or make the selected user a friend of the user, send a message to the selected user, and to make the profile page 52 of the selected user a tab 58 on the user's home page.

A registered user can invite a friend or friends to join the website by uploading a group picture or photograph 56 to the website. As used herein, the term the "group picture" generally refers a photograph showing a plurality of individuals. FIG. 5 shows an exemplary invitation page or screen 60 for using a group picture 56 to invite friends to join the website. Once the group picture 56 is uploaded, the user labels or tags the picture 56 by identifying the people in the group picture 56 by first and last name and e-mail address. The user also puts a box or box tag 62 around each person's head. Once the information is entered and the "Invite the FreezeCrowd" button 64 is selected, an e-mail invitation is automatically sent to each friend identified in the group picture 56. Each friend receives an email invite which enables them to sign up for the website and asks them to confirm their presence in the group picture 56. By default the group picture 56 is cropped and enlarged (based on where the user put the box 62 around a person's head) to create the friend's main profile picture 47. A person is not tagged or identified by box 62 in a group picture 56 for viewing on the website by others until they confirm their presence in the group picture 56. The group picture 56 remains on the website even if one or more people in the group picture 56 do not sign up for the website. A person in the group picture 56 who declines, can always be re-invited to the website through group picture invitation at a later time, unless they opt out from receiving invitations from the website. Any person in a group picture 56 who is not already a registered member of the website can be invited to the website through picture invitation. This process can also be used in connection with uploaded videos, where video face detection is used to tag pictures of persons in the video.

Figure 6:
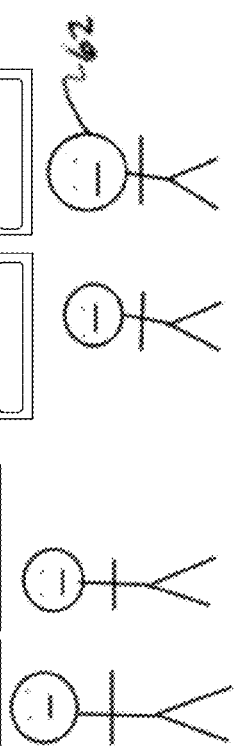
FIG. 6 is a screen for using a group picture to register a group of friends to the website of the system of FIG. 1.

A similar process can be used to register yourself and friends to the website at the same time by uploading a group picture or photograph 56 to the website. FIG. 6 shows an exemplary registration page or screen 66 for using a group picture 56 to register of group of people to the website. A group of people can together register to the website with a group picture 56 by putting a box 62 around each of the heads in the group picture 56, and tagging the people in the picture by identifying the people in the group picture 56 by first and last name and e-mail address. The registrant who registers everyone in the group picture 56 enters a password and registers by selecting the "Register FreezeCrowd" button 68. Everyone else in the group picture 56 registers to the website when they receive a link sent to them through e-mail which leads them to a webpage where they can complete the registration process. This process can also be used in connection with uploaded videos, where video face detection is used to tag pictures of persons in the video.

Figure 8:
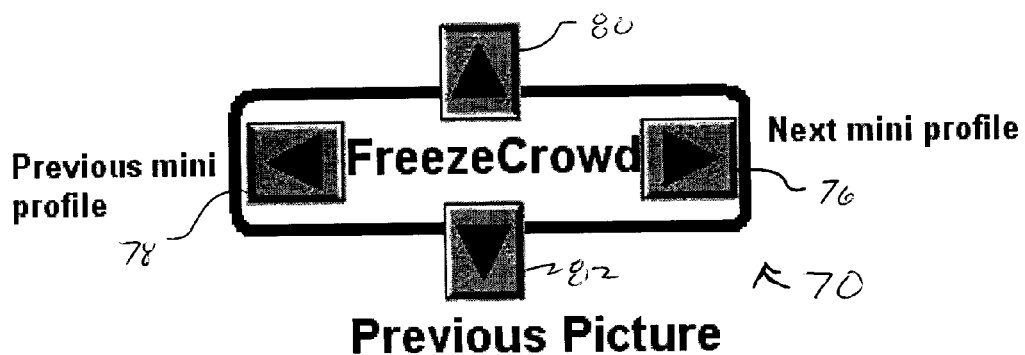
FIG. 8 is a diagrammatic view of an operator button for use with group pictures in the system of FIG. 1.
Figure 9:
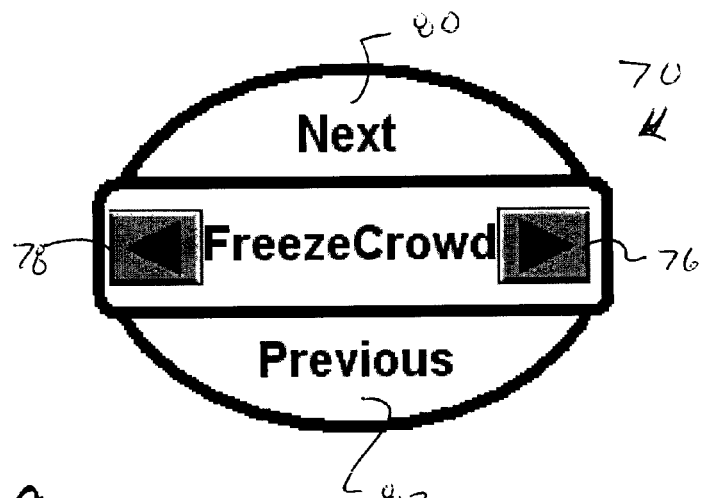
FIG. 9 is a diagrammatic view of an alternative operator button for use with group pictures in the system of FIG. 1.

As shown in FIG. 7a, when a "FreezeCrowd' or group picture 56 is viewed on the website, the user sees the group picture 56 as uploaded. However, when the user presses a "FreezeCrowd" or operating button 70 (shown in FIGS. 8 and 9), the user sees boxes 72 around the heads of the persons in the group picture 56 (best shown in FIG. 7b). The name of each person can also be displayed in or near their box if desired. FIG. 8 illustrates a suitable "FreezeCrowd" button 70 which is preferably located near the bottom right corner of each "FreezeCrowd" group picture 56. FIG. 9 shows an alternative FreezeCrowd" button 70. It is noted that the "FreezeCrowd" button 70 can take any suitable form. This "FreezeCrowd" button 70 preferably follows the user's mouse curser when the user moves over their curser over the picture 56. When the "FreezeCrowd" button 70 is pressed, a user can get more information on a user in the picture 56 by hovering over their name and/or box 72 over the head or clicking on their name or box 72 so that a mini profile 74 is displayed (best shown in FIG. 7c). The illustrated "FreezeCrowd" button 70 has a next mini profile arrow or button 76 for the user to see the next mini profile 74 in the group picture 56 and a previous mini profile arrow or button 78 for the user to see the previous mini profile 74 in the group picture 56 (best shown in FIG. 7d). The illustrated next "FreezeCrowd" button 70 also has a next picture arrow or button 80 for the user to see the next group picture 56 or "FreezeCrowd" and a previous picture arrow or button 82 for the user to see the previous group picture 56 or "FreezeCrowd" in the gallery of group pictures 56 (best shown in FIG. 7e).

Head detection technology may be used to detect a person's head in a group picture 56. This process is used with filtered colors to identify the person in the group picture 56 by adding a color filter to the group picture 56 when the user hovers their mouse curser over the name or picture. When the "FreezeCrowd" button 70 is pressed, a filter may blink for a second for a special effect. The color of the box 72 around a user's head will correspond to colors on their user profile page 52 (see FIG. 4). A colored filter may be shown to outline a person, their head, or any other desired item.

Figure 10:
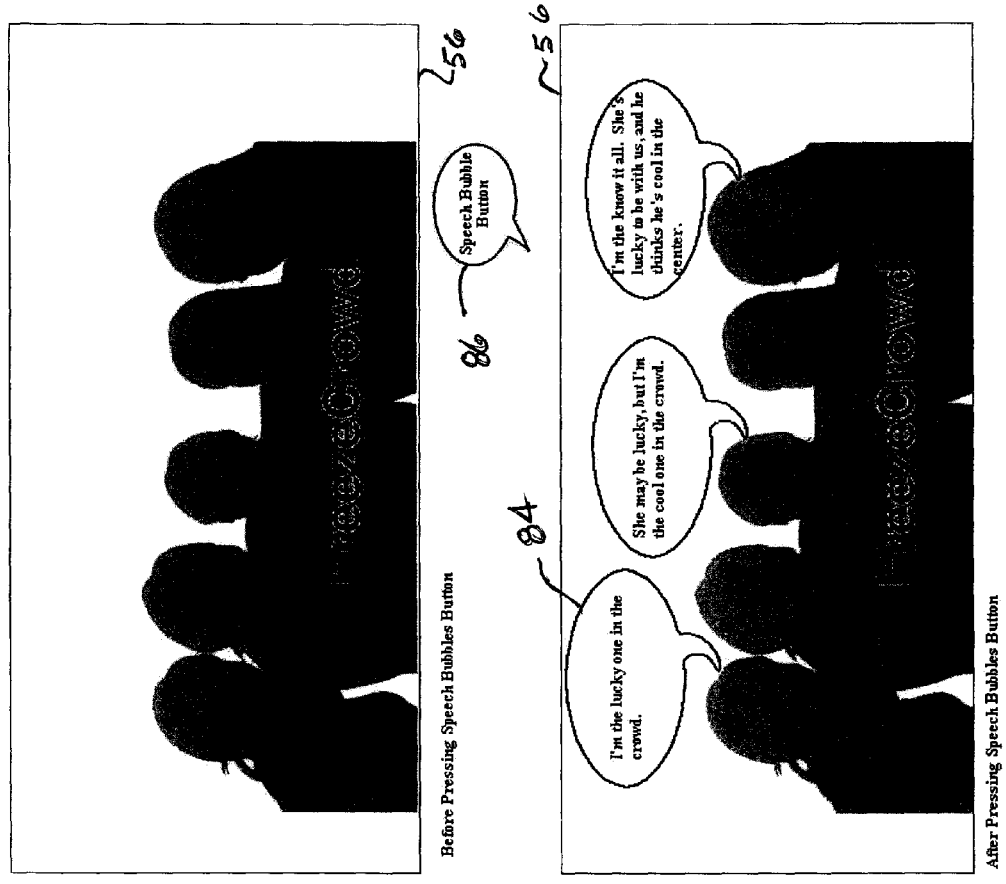
FIG. 10a is a screen showing a group picture with a speech bubble button of the system of FIG. 1.
FIG. 10b is a screen showing the group picture of FIG. 10a with the speech bubble button activated and speech bubbles viewable on the group picture.

As shown in FIGS. 10a and 10b, a user preferably can create a visible speech bubble 84 for a "FreezeCrowd' or group picture 56 and tag or associate that speech bubble 84 with a particular individual in the group picture 56. The user preferably has the ability to edit the speech bubble 84 once they have been tagged to an individual. A speech bubble 84 preferably can only be tagged onto the image of a registered user of the site and the tagged user must confirm that the speech bubble 84 is acceptable for display before it will be shown in a group picture 56 on the website.

As shown in FIG. 10a, a bubble activation button 86 appears below the group picture 56 when the group picture 56 is displayed once a speech bubble 84 has been confirmed by the tagged user. The activation button 86 provides a visual indicator that speech bubbles 84 exist for viewing and, when selected, activates the speech bubbles 84 associated with particular individuals in the displayed group picture 56 so that the speech bubbles are viewable in connection with the group picture 56. The illustrated activation button 86 is in the shape of a speech bubble and is identified as the "Speech Bubble Button" but any other suitable configuration and name can alternatively be utilized. As shown in FIG. 10b, speech bubbles 84 that have been tagged to particular individuals in the group pictures 56 are viewable once the activation button 86 is pressed. The speech bubbles 84 appear in the group picture 56 next to the tagged individual an contain the text that was entered and approved. By pressing the activation button 86 again, the speech bubbles 84 are hidden from view (as shown in FIG. 10a).

Thus, the user can selectively view and hide the speech bubbles 84 as desired. Preferably, the text in the speech bubbles 84 can be searched.

It is noted that preferably tag items other than just speech bubbles 84 can be added and tagged to individuals in the group picture 56. For example, the tag items can include angel wings, hats and other items which can be tagged to people in a picture 56. Other activation buttons are provided to represent those tag items and show that such items have been tagged to the group picture 56 and enable those tag items to be selectively displayed and hidden from the picture. In one embodiment, a user may link RSS, Atom, or any kind of feed to a photo and the tagged people or objects in the photo. In another embodiment, a user may link RFID or any wireless identity information to the photo.

Figure 11:
FIG. 11 is a diagrammatic view of contextual based search window of the system of FIG. 1.

A contextual based "FreezeWord" is a technology that works within the website. When a user of the website visits a user profile page 52 (see FIG. 4), they are able to view different sections known as fields provided in the profile page 52. These fields may consist of Favorite Music, Favorite Movies, Favorite Books, Favorite Television Shows, Favorite Places, Interests, and others. As best shown in FIG. 11, the user can click or mouse over a Field such as "Movies" and a movie search box 88 with search engine provided by Google is provided in context to movies. It is noted that any other suitable search engine other than Google can alternatively be utilized. The search is a specific Movie Search, Book Search, etc. The user can search for a movie or any value created by another on demand, or any field, whereas the user would enter their own search which will be contextually relevant to that field or section (movies, books, music, television etc.) of the profile. The user can click on a "Value" which corresponds to the Field and search for that "Value" in a contextual manner which relates back to that word. So that, if the word is a movie, the user can search for it via a movie search, a book, music, and such.

Contextual search works via making categories for fields, and searching for values within this search, or searching an entered value within a Field. The user is able to take a contextual value from one user's profile and add this value to their own profile. For instance, if a profile page for another person has a movie listed that a visiting user likes, the visiting user can click on "add to (name of movie)" to my profile. This can be done without having to edit their profile page. If a user would like to highlight a word within another user's profile page, the user can do so, by clicking on the word and clicking highlight word, in a different color.

Various search methods can be customized for the user, and provided in the menu for the user to search, but the innovation of contextual search is that the search menu is relevant to the field or section the user is in. Search history and RSS Feeds can be added to the "FreezeWords", and "FreezeWords" can be customized by choosing specific categories and sections. Keywords can be tagged with icon images, and words can be tagged with annotated sentences which describe the keyword. For example, but not limited thereto, someone may use the keyword "my dog" and the annotation may be "I like to walk my dog Sparky in the park" and there could be an icon (sized 128×128 pixel image) of Sparky when they click on "my dog" in the person's interests. By default there will be icons which associate with keywords, for instance an image of a dog for the keyword dog will be shown. If the user likes, they can customize this image only on their own profile page.

Figure 12B:
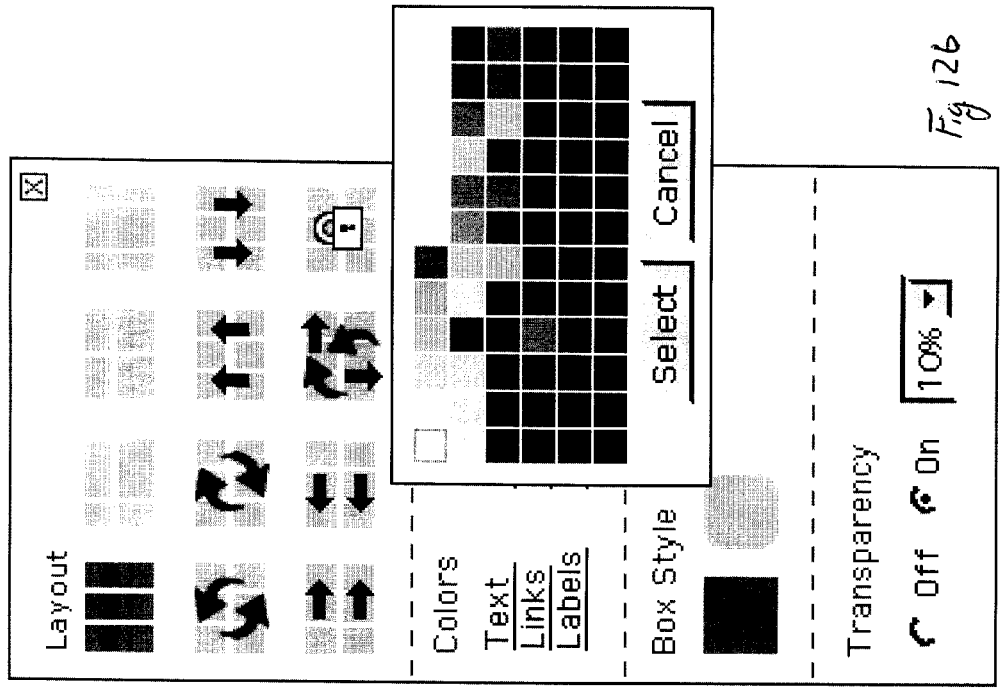
FIGS. 12a and 12b are diagrammatic views of a portal customization window of the system of FIG. 1.
Figure 12A:
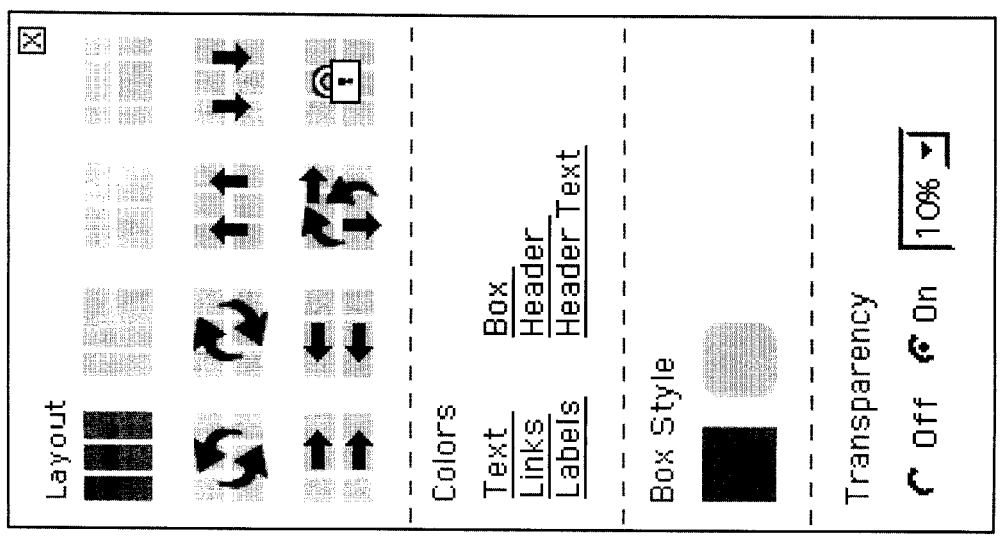

A portal to the website is provided for each of user. This portal can be customized by visiting users for improved navigation, and added viewing enjoyment. A user visits another users profile page 52 (see FIG. 4), and looks at the navigation menu on top. The visiting user can customize the portal in new ways that have not been done before. The portal can be customized with movement of columns, rows, portlets, randomization, cascade stairs, and different shapes. As best shown in FIG. 12a and 12b, customization includes: (A) one, two or three columns, where columns can have splits such as a 25/70 Split for two columns or a 30/30/30 split for a three column; (B) rotate clockwise or rotate counterclockwise, where users can click the rotate button to navigate with portlets and the content and title from portlet number one can move to portlet number four, and portlet number four moves to portlet number seven, and so forth; (C) move row up, move row down, move column left, move column right, where the user can move one portlet by clicking on these buttons and portlet one would move to portlet two, and portlet three would move to portlet one each of the columns in the portlet; (D) randomize would move portlets randomly within the portlet, and this is more of a "fun feature" for the user; (E) floating of portlets in a fixed matrix portal would allow a user to detach and attach a portlet from the portal and the user can also expand and collapse the portlet when detached.

Users of the website can see mini profiles and profiles on demand in an iFrame browser which can be detached to make the iFrame browser a tab. The user mouses over a user name and/or picture anywhere on the website and a mini profile is shown. If the user clicks on a picture or a the user's name or a flag attached to the user's name, the user will be shown a profile on demand in an iFrame browser. The user can click on a button in the toolbar of the iFrame browser to detach the iFrame to make it a tab on the website. Similar user functionality can be used for viewing web sites on the website.

Figure 13B:
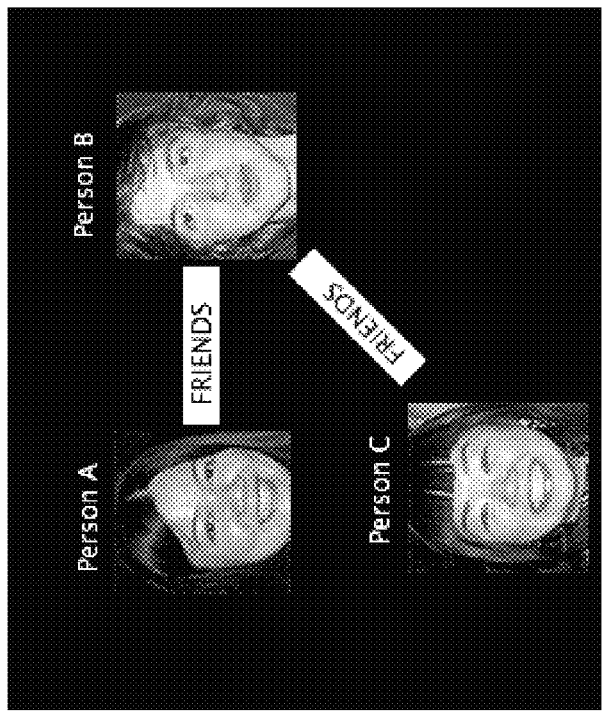
Figure 13A:
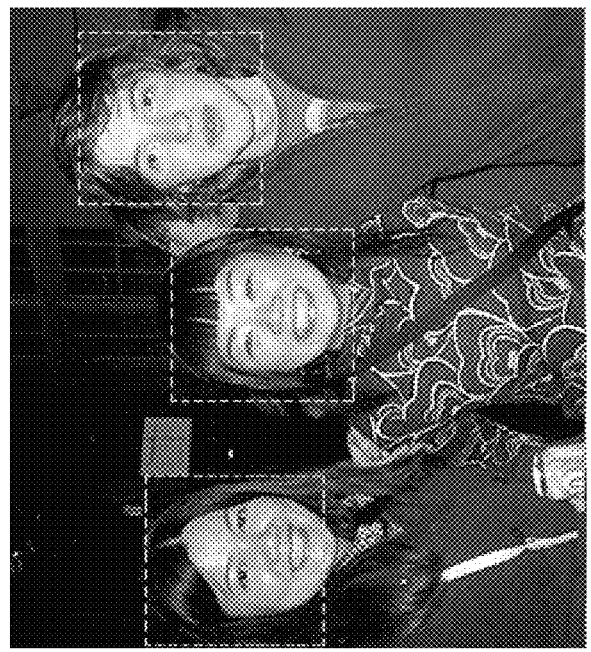
FIG. 13a is an exemplary group photo containing three individuals.

In another embodiment, the system is further configured to crop faces of individuals in a group photograph and organize the cropped photos according to a user preference. FIG. 13a illustrates an exemplary group photo containing three individuals. After individuals have been identified, such as in a manner described above, the system may crop the faces of each individual in the group photo, and display separate images of each face on the website page or portal, as shown in FIG. 13b.

In addition to faces, objects may also be cropped, tagged, and displayed. In one embodiment, object or text recognition software may be employed to recognize products of sponsors that appear in photos. Recognized products may be highlighted or a message may be displayed. In alternative embodiment, object or text recognition software may be employed to recognize products of a competitor. In one embodiment, advertisements may be sent to the user who posted the photo that included the recognized product. Advertisements may be sent electronically to the email address or mobile device associated with the user.

In one embodiment, faces from two or more photos may be cropped and displayed as separate images simultaneously. In one embodiment, if the same individual appears in multiple photos, multiple images of that individual are displayed on the website page or portal. In an alternative embodiment, only a single image of the individual is displayed on the website page or portal. In another alternative embodiment, the user may select to display multiple images or a single image of the same individual.

After the face of each individual is cropped, the cropped images may be displayed on a pre-selected background. In one embodiment, the background is a solid color, such as black or white. In an alternative embodiment, the background is multi-colored or is an image. In another alternative embodiment, a background selection tool is employed to allow a user to select the background.

Figure 14:
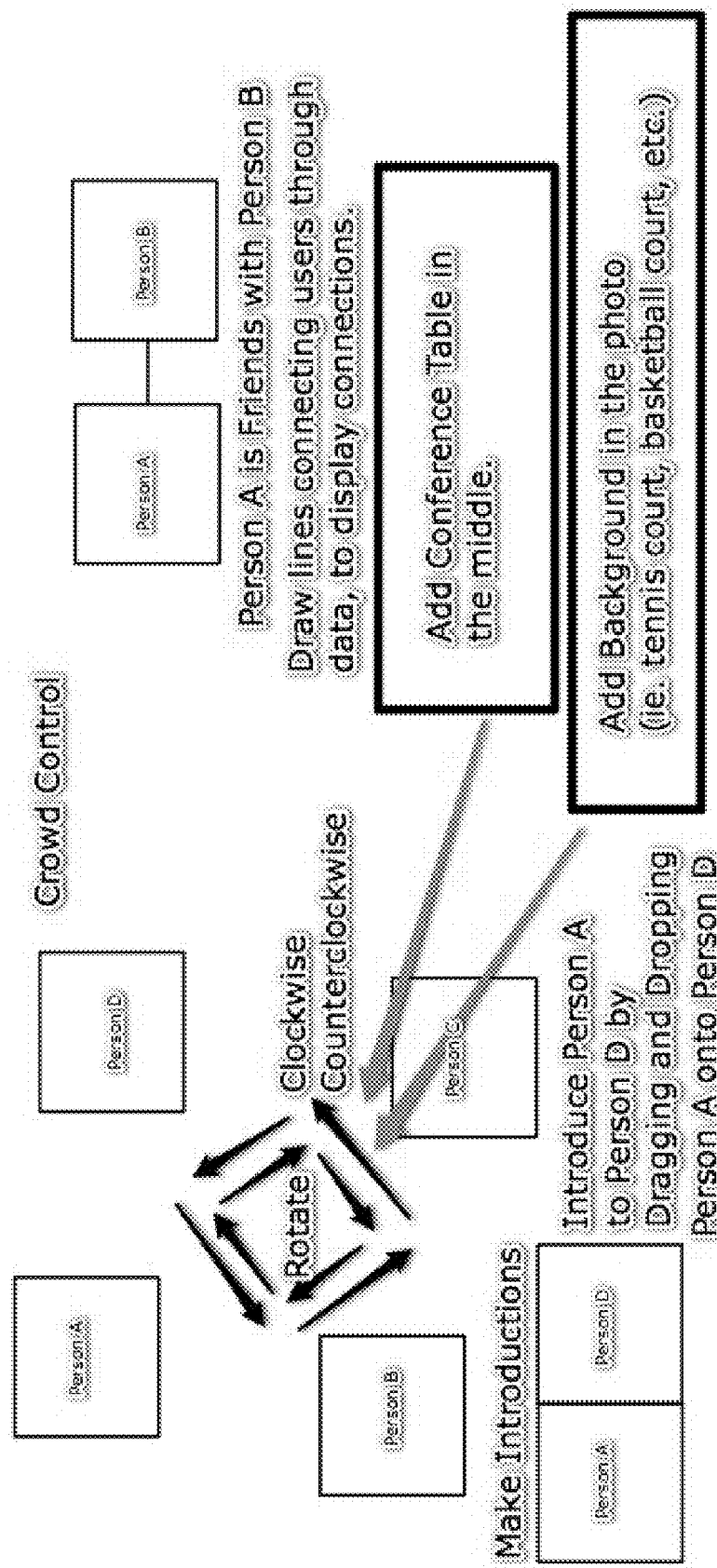
FIG. 14 is a schematic drawing of exemplary ways to arrange and display images.

FIG. 14 shows schematic drawings of exemplary ways to arrange and display images. After the face of each individual is cropped and displayed as a separate image, the images may be arranged and displayed in a variety of manners. In one embodiment, the system includes a filter interface to allow a user to only display the faces of individuals that meet a user-established criteria. For example, a user may request that only the face of individuals having a specified role or a specified interest be displayed (i.e., individuals that like a certain movie, sport, etc.). As another example, a user may request that only faces of individuals having a certain physical characteristic be displayed.

In one embodiment, a visual representation of the user-established criteria is also displayed with the cropped images. The visual representation may include text, images, or a combination of text and images. For example, if the user selects to display all individuals who like the movie It's a Wonderful Life, an image from the movie may be displayed, with text stating: "the following people like the movie It's a Wonderful Life," along with the cropped images of individuals who meet this criteria.

In one embodiment, the filter interface instructs the website page or portal to display the cropped images by applying a Boolean algorithm to the profile information associated with the cropped photo. In an alternative embodiment, recognition software, such as facial recognition software, color recognition software, and other recognition software is also employed. Employing such recognition software will further allow a user to request, for example, that only individuals with blue eyes be displayed or only individuals who are smiling be displayed.

It should be understood that multiple filter interfaces may be employed by a user. Alternatively, a single filter interface having multiple criteria options may be employed.

In one embodiment, a manual filter is also available to the user. In one such embodiment, a user may move a selection arrow over an image by using a mouse, and select a button to hide the selected image.

In addition to or as an alternative to a filter interface, an organization tool is available to a user to allow the user to arrange cropped images in a user-specified manner. For example, the organization tool may allow a user to sort the cropped images to display individuals in alphabetical order by name, or in age order. As another example, the organization tool may allow a user to group images into various categories, such as by gender, home state, college, etc.

identify common interests, roles, or friendships of the first and second individuals.

In one particular example utilizing several of the features described above, a group photo of a sports team may be cropped, and the user may elect to display the images according to position. For example, in a picture of a hockey team, after the images of individuals players are cropped and displayed, the user may elect to display the cropped images over a background image of a hockey rink. The user may then elect to display the cropped images in groups according to position. The user may then elect to display only the starting players of the team.

The above features may be made available to a user by a control that is embedded in the website page or portal. Such controls include, without limitation, icons, hyperlinks, java-enabled buttons, and other known controls. Alternatively, the features may be incorporated in a side module that is separate from the website page or portal.

In one embodiment, a manual organization tool is also available to the user. The user may click and drag cropped images to preferred screen locations within the website page or portal. In one particular embodiment, illustrated in FIG. 14, a user may introduce two or more people to each other by dragging an image of a first individual and dropping it next to, or on top of, an image of a second individual. This action may cause a message to be sent to one or both of the individuals. The message may include various information, such as the name, role, and other profile information of the individuals being introduced, as well as the name, role, and other profile information of the user who made the introduction. In one particular embodiment, the message may The system may also include privacy features. In one embodiment, a user may delete tags of herself that were added to a photo by a third party. In another embodiment, a user may remove photos of herself from the website. In yet another embodiment, a user may limit access to photos of herself. For example, a user may establish access parameters to allow only identified individuals from seeing the photo. Alternatively, a user may establish access parameters to prevent identified individuals from seeing the photo.

In another embodiment, a user may cover, blur, or otherwise distort pictures of herself to prevent others from seeing the picture. For example, a user may cover her image with a solid square, circle, or other geometric shape, or with another image. In one known example, a user may cover images of herself with an image of an ice cube.

In one embodiment, a user may cover, blur or distort an entire group photo. In another embodiment, a user may only be permitted to cover, blur, or distort her own image in a group photo. In one particular embodiment, a user may set parameters such that authorized individuals will see her image when viewing a group photo, but unauthorized users will see a covered, blurred, or distorted image of her when viewing the same group photo.

In one embodiment, a user may tag the covered, blurred, or distorted image and provide an explanation why the image was covered, blurred, or distorted. In this embodiment, when another user move a cursor over the image and text will pop up and state the explanation.

In another embodiment, images may be tagged with geo-physical information so that an individual's profile will include location information. This may be accomplished by a user manually updating location information in her profile. This may also be accomplished by a user tagging her image with an RFID, GPS tracking device (such as a GPS in a car or in a mobile phone or other mobile device), or other known tracking device.

Figure 15:
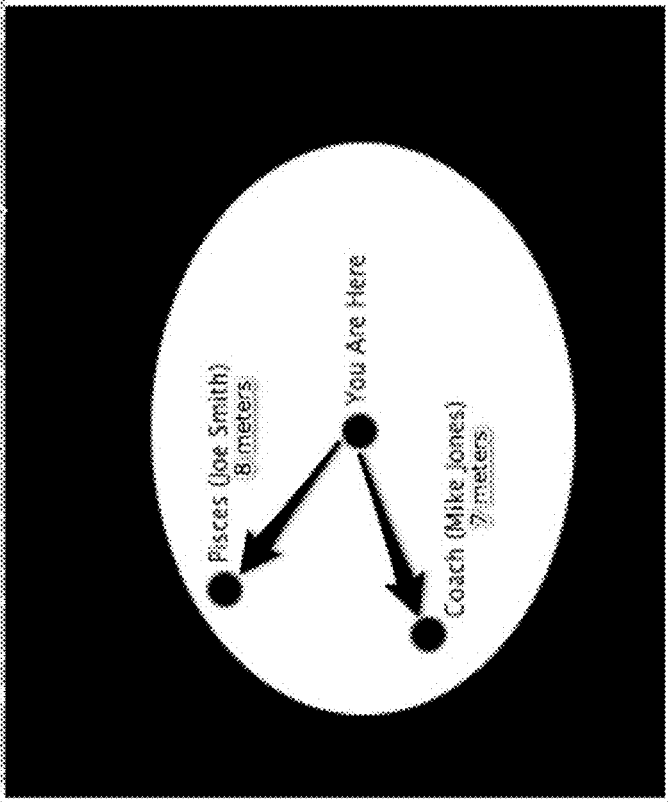
FIG. 15 is a schematic drawing of a geophysical detection feature.

If an individual has provided geophysical information, users may search for the location of an individual by name. Additionally, a user may search for individuals having a specified role who is within a specified proximity. For example, if a user is in a room with someone you can ask the question, "have I taken a photo with this person," and the website can show which individuals in the room the user has taken a photo with. FIG. 15 illustrates an example of this feature a real world situation. Here, a user searches for individuals who have a role of "coach" who are within a 10 meter radius. The user also searches for individuals who have a role of "Pisces" who are within a 10 meter radius. The user may further narrow the search to find individuals with those specified roles who has not appeared in a picture with the user.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, one of the above described embodiments may further employ telescoping arms. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method of operating a website for an online social networking comprising:
   receiving a group picture depicting a plurality of individuals;
   identifying the presence of a face of at least one individual depicted in the group picture;
   receiving personal information related to at least one identified face in the group picture, wherein said personal information comprises a role;
   cropping at least one identified face in the group picture to create a plurality of cropped face images;
   selectively displaying the plurality of cropped face images from the group picture according to a defined criteria;
   providing a manual organization tool to a first user;
   allowing the first user to move one of the plurality of cropped face images to preferred screen locations within a page of the website; and
   sending a message based on the location of the cropped image chosen by the first user to a second user associated with that cropped face image.

2. The method of claim 1, wherein the defined criteria is a user-defined criteria.

3. The method of claim 1, wherein the defined criteria is a pre-selected criteria.

4. The method of claim 1, further comprising enabling visiting users to customize display of portlets for a profile page associated with an identified face.

5. The method of claim 1, further comprising
   providing an organization tool to a user;
   accepting a user criteria in the organization tool, wherein said user criteria comprises a selected role or a selected specific interest; and
   arranging the plurality of cropped face images according to the user criteria.

6. The method of claim 1, further comprising
   identifying the presence of an object meeting pre-defined criteria in the group picture;
   cropping the object meeting the pre-defined criteria in the group picture to create at least one cropped image; and
   displaying the cropped object image.

7. The method of claim 1, wherein
   the location of the cropped image chosen by the first user is adjacent to or on top of a second of the plurality of cropped face images; and
   the message sent to the second user is a message of introduction to a third user associated with that second cropped image.

* * * * *